(12) United States Patent
Hapsari et al.

(10) Patent No.: US 11,089,569 B2
(45) Date of Patent: Aug. 10, 2021

(54) USER EQUIPMENT AND CAMPING-ON METHOD

(71) Applicant: NTT DOCOMO, INC., Tokyo (JP)

(72) Inventors: Wuri Andarmawanti Hapsari, Tokyo (JP); Hideaki Takahashi, Tokyo (JP); Tooru Uchino, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/342,716

(22) PCT Filed: Oct. 19, 2017

(86) PCT No.: PCT/JP2017/037853
§ 371 (c)(1),
(2) Date: Apr. 17, 2019

(87) PCT Pub. No.: WO2018/074552
PCT Pub. Date: Apr. 26, 2018

(65) Prior Publication Data
US 2020/0045671 A1    Feb. 6, 2020

(30) Foreign Application Priority Data

Oct. 21, 2016   (JP) .............................. JP2016-207391

(51) Int. Cl.
*H04W 68/00*   (2009.01)
*H04W 68/02*   (2009.01)
(Continued)

(52) U.S. Cl.
CPC ........... *H04W 68/02* (2013.01); *H04W 28/06* (2013.01); *H04W 48/16* (2013.01);
(Continued)

(58) Field of Classification Search
None
See application file for complete search history.

(56) References Cited

U.S. PATENT DOCUMENTS

| 2011/0105123 A1* | 5/2011 | Lee ...................... H04W 24/10 455/436 |
| 2013/0010964 A1* | 1/2013 | Fong .................... H04L 5/0092 380/277 |

(Continued)

OTHER PUBLICATIONS

International Search Report issued for PCT/JP2017/037853, dated Dec. 19, 2017 (5 pages).

(Continued)

*Primary Examiner* — Erika A Washington
(74) *Attorney, Agent, or Firm* — Osha Bergman Watanabe & Burton LLP

(57) ABSTRACT

User equipment of a radio communication system including a base station that performs communication using a maximum bandwidth which is a largest bandwidth available for communication and the user equipment in which a largest bandwidth available for communication is equal to or less than the maximum bandwidth, the user equipment including a receiver unit configured to receive a radio signal transmitted from the base station; and an acquisition unit configured to acquire a radio resource of a master information block corresponding to a synchronization signal, a radio resource of a system information block, and a radio resource of a paging channel, wherein the receiver unit monitors the radio resource of the synchronization signal, the radio resource of the master information block, the radio resource of the system information block, or the radio resource of the paging channel, when the user equipment is in an RRC idle mode.

6 Claims, 12 Drawing Sheets

(51) Int. Cl.
  *H04W 76/28*    (2018.01)
  *H04W 76/27*    (2018.01)
  *H04W 28/06*    (2009.01)
  *H04W 48/16*    (2009.01)
  *H04W 72/04*    (2009.01)
  *H04W 74/08*    (2009.01)
  *H04W 56/00*    (2009.01)

(52) U.S. Cl.
  CPC ... *H04W 72/0453* (2013.01); *H04W 74/0833* (2013.01); *H04W 76/27* (2018.02); *H04W 76/28* (2018.02); *H04W 56/001* (2013.01)

(56) References Cited

U.S. PATENT DOCUMENTS

| | | | | |
|---|---|---|---|---|
| 2013/0272294 | A1* | 10/2013 | Mildh | H04W 56/001 370/350 |
| 2014/0206341 | A1* | 7/2014 | Siomina | H04W 36/0088 455/422.1 |
| 2015/0126206 | A1* | 5/2015 | Krishnamurthy | H04W 76/18 455/452.1 |
| 2015/0133134 | A1* | 5/2015 | Ode | H04W 48/20 455/450 |
| 2016/0165521 | A1* | 6/2016 | Choi | H04W 48/10 455/434 |
| 2017/0111886 | A1* | 4/2017 | Kim | H04W 72/042 |
| 2017/0367120 | A1* | 12/2017 | Murray | H04W 72/046 |

OTHER PUBLICATIONS

Written Opinion issued for PCT/JP2017/037853, dated Dec. 19, 2017 (5 pages).

Huawei, HiSilicon; "Cell definition"; 3GPP TSG-RAN WG2 Meeting #95bis R2-167001; Kaohsiung, Oct. 10-14, 2016 (4 pages).

MediaTek Inc.; "Consideration on narrowband anchor based access"; 3GPP TSG RAN WG1 Meeting #86bis R1-1609562; Lisbon, Portugal, Oct. 10-14, 2016 (4 pages).

Anass Benjebbour et al.; NTT DOCOMO Corporation, NTT DOCOMO Technical Journal "5G Radio Access Technology"; Jan. 2016 (25 pages).

3GPP TS 36.104 V14.0.0; 3rd Generation Partnership Project; Technical Specification Group Radio Access Network; Evolved Universal Terrestrial Radio Access (E-UTRA); Base Station (BS) radio transmission and reception (Release 14)'. Jun. 2016 (204 pages).

* cited by examiner

USER EQUIPMENT AND CAMPING-ON METHOD

TECHNICAL FIELD

The present invention relates to user equipment and a camping-on method.

BACKGROUND ART

In the standard of long term evolution (LTE), a channel bandwidth which can be used by a base station for one carrier (a single carrier) is defined to be any one of six patterns. Specifically, six patterns of 1.4 MHz, 3 MHz, 5 MHz, 10 MHz, and 20 MHz are defined (see Non-Patent Document 1).

In the 3GPP, in order to achieve an increase in system capacity, an increase in a data transmission rate, and reduction of latency in a radio section, a radio access technique called 5G has been studied (see Non-Patent Document 2).

PRIOR ART DOCUMENT

Non-Patent Document

Non-Patent Document 1: 3GPP TS 36.104 V14.0.0 (2016-06)
Non-Patent Document 2: "5G Radio Access Technology," NTT DOCOMO Technical Journal, NTT DOCOMO Inc., January, 2016

SUMMARY OF THE INVENTION

Problem to be Solved by the Invention

In usual LTE, for performing communication with a bandwidth greater than 20 MHz, it is necessary to bundle a plurality of carriers using carrier aggregation (CA) or dual connectivity (DC). However, since it is assumed in the 5G that an operation is started using a frequency other than that of the usual LTE, it has been studied to support, for one carrier (a single carrier), a bandwidth (for example, several hundreds of MHz to several GHz) broader than that of the LTE. It has been studied, for 5G, to accommodate units of user equipment having various user equipment (UE) capabilities, which include, not only smartphones, but also Internet of Things (IoT) devices.

There is a need for a technique that allows user equipment in a Radio Resource Control (RRC) IDLE mode to appropriately execute a communication process in an environment in which there are units of user equipment that support various bandwidths that are less than or equal to a bandwidth with which a base station can communicate.

Means for Solving the Problem

User equipment according to the disclosed technology is user equipment of a radio communication system including a base station that communicates using a maximum bandwidth which is a largest bandwidth available for communication, and the user equipment for which a maximum bandwidth available for communication is less than or equal to the maximum bandwidth. The user equipment includes a receiver unit that receives a radio signal transmitted from the base station within a band of the maximum bandwidth; and an acquisition unit configured to acquire a radio resource of a master information block corresponding to a synchronization signal received by the receiver unit among one or more synchronization signals transmitted in the band of the maximum bandwidth, a radio resource of a system information block indicated by the master information block received by the receiver unit, and a radio resource of a paging channel indicated by at least one of the master information block and the system information block received by the receiver unit, wherein, when the user equipment is in a Radio Resource Control (RRC) idle mode, the receiver unit monitors at least one of the radio resource of the received synchronization signal, the radio resource of the master information block, the radio resource of the system information block, and the radio resource of the paging channel.

Advantage of the Invention

According to the disclosed technology, there is provided a technique that allows user equipment, in particular, in an RRC IDLE mode to appropriately execute a communication process, in an environment in which units of user equipment coexist, which support various bandwidths that are less than or equal to a bandwidth with which a base station can communicate.

EMBODIMENTS OF THE INVENTION

Figure 1:
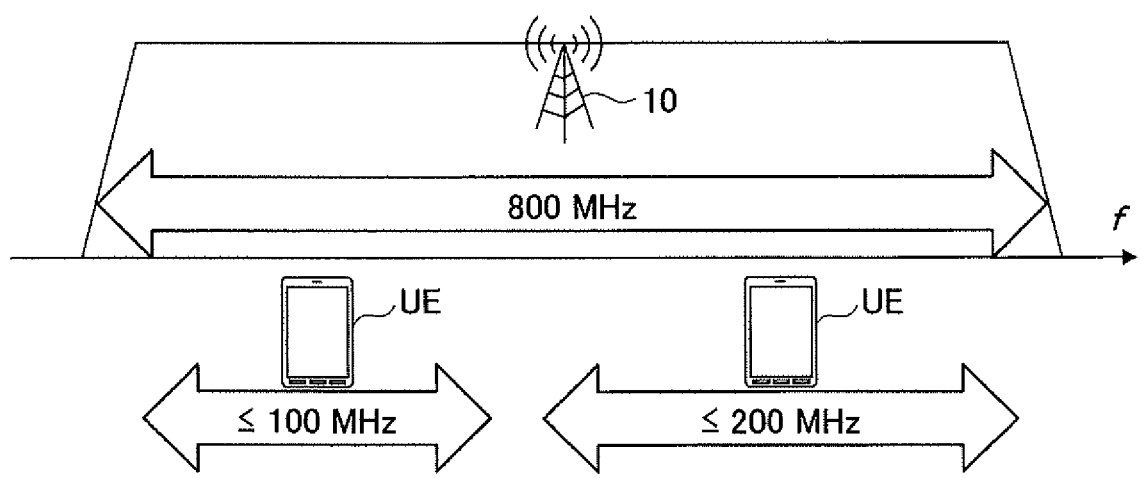
FIG. 1 is a diagram illustrating an example of a configuration of a channel bandwidth.

The conventional LTE defines that user equipment is expected to support at least a maximum channel bandwidth (20 MHz) in the standard. However, in 5G, it is unlikely to cause all units of user equipment to support the maximum channel bandwidth defined in the standard. For example, it is expected that user equipment for which high-speed communication is not required, such as an IoT device, supports only a bandwidth (100 MHz or less or 200 MH or less in the example illustrated in FIG. 1) smaller than the maximum channel bandwidth (800 MHz in the example illustrated in FIG. 1) in the standard as illustrated in FIG. 1, for the purpose of suppressing manufacturing costs to be low or the like. Accordingly, there is a need for a scheme capable of flexibly performing communication even in an environment in which units of user equipment coexist, which support various bandwidths that are less than or equal to a bandwidth with which a base station can communicate. Embodiments of the present invention are described below with reference to the accompanying drawings. The embodiments described below are only examples and embodiments of the invention are not limited to the following embodiments. For example, a radio communication system according to the embodiments is assumed to be LTE-based and 5G-based systems, but the invention is not limited to LTE and 5G and can be applied to another scheme. Note that, in the specification and the claims, "LTE" is used in broad meaning including, not only a communication scheme supporting Release 8 or 9 of 3GPP, a communication scheme supporting Release 10, 11, 12, or 13, or a 5G communication scheme supporting Release 14 and subsequent releases.

<System Configuration>

Figure 2:
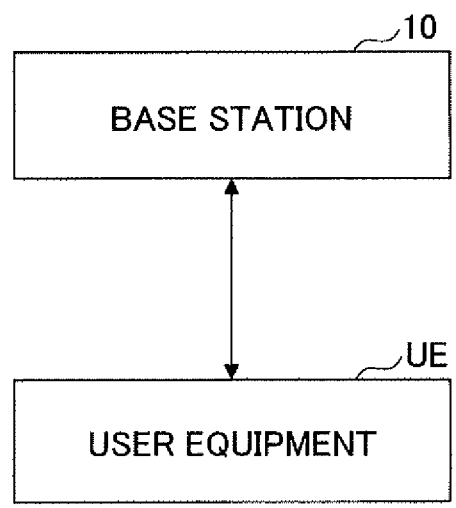
FIG. 2 is a diagram illustrating an example of a configuration of a radio communication system according to an embodiment.

FIG. 2 is a diagram illustrating an example of a configuration of a radio communication system according to an embodiment. As illustrated in FIG. 2, the radio communication system according to the embodiment includes a base station 10 and user equipment UE. One base station 10 and one user equipment UE are illustrated in FIG. 2, but two or more base stations 10 may be present or two or more units of user equipment UE may be present.

Examples of the user equipment UE includes a terminal that frequently transmits and receives a large amount of data such as a smartphone (a mobile broadband (MBB) terminal) and a terminal that transmits and receives a small amount of data such as an IoT device (a machine type communication (MTC) terminal, Internet of things (IoT), or the like), and this embodiment can be applied to all types of units of user equipment UE.

The base station 10 communicates with the user equipment UE via a radio bearer which is established between the user equipment UE and the base station. The base station 10 may be referred to as "enhanced NodeB (eNB)," "new radio (NR) node," "gNB," "evolution LTE enhanced NodeB (eLTE eNB)," or the like. The base station 10 may include one or more remote radio heads (RRHs).

<Outline of Communication Method in Radio Communication System>

An outline of a communication method in the radio communication system is described below. It is assumed that the radio communication system according to the embodiment supports the following communication method.

(Bandwidth)

Since only six patterns are defined as a channel bandwidth in LTE as described above, channel bandwidths which are supported by the user equipment UE and the base station 10 are limited to the six patterns. By using existing radio transmission and reception techniques, channel bandwidths other than the six patterns in LTE can be supported as the channel bandwidths in the user equipment UE and the base station 10. However, since the six patterns are defined as the channel bandwidths in LTE, the channel bandwidths which are supported by the user equipment UE and the base station 10 are limited to the six patterns in LTE.

In contrast, in the radio communication system according to this embodiment, the channel bandwidths of restrictive patterns as in LTE are not provided, but an arbitrary bandwidth from a narrow bandwidth to an ultra-broad bandwidth (for example, 5 GHz) can be supported by the user equipment UE and the base station 10.

In this embodiment, a term "available maximum bandwidth" indicating a largest bandwidth which can be used for communication by the user equipment UE/base station 10 is used. The user equipment UE/base station 10 can communicate using a band with a bandwidth equal to or less than the available maximum bandwidth.

The "available maximum bandwidth" may be referred to as a "transmission bandwidth configuration." A bandwidth in which guard bands are added to both sides of the "available maximum bandwidth" may be referred to as a "channel bandwidth." The "available maximum bandwidth" may be referred to as a "channel bandwidth." The "available maximum bandwidth" may be replaced with any one of a "transmission bandwidth," a "reception bandwidth," a "transmission/reception bandwidth," a "maximum bandwidth," a "maximum transmission bandwidth," a "maximum reception bandwidth," a "maximum transmission/reception bandwidth," and a "system bandwidth." The "available maximum bandwidth" may be replaced with other names.

Figure 3:
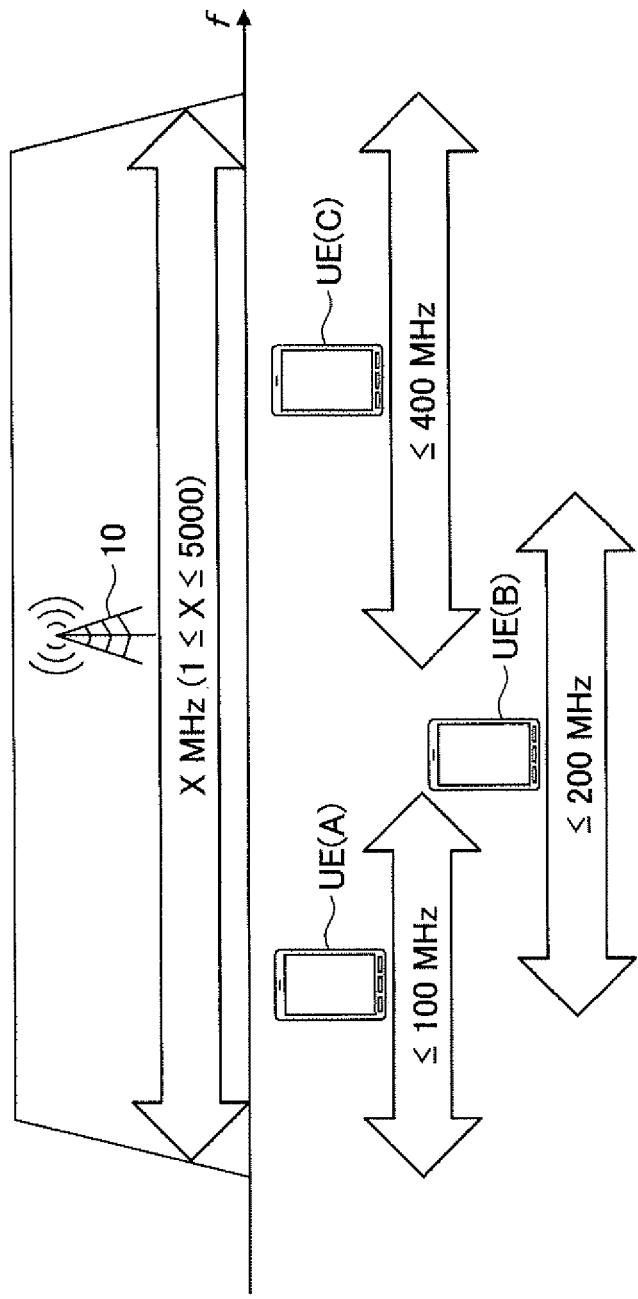
FIG. 3 is a diagram illustrating a specific example of an available maximum bandwidth.

FIG. 3 illustrates a use example of an available maximum bandwidth in the radio communication system according to this embodiment. The available maximum bandwidth illustrated in FIG. 3 may be construed as an available maximum bandwidth of a DL, may be construed as an available maximum bandwidth of an UL, or may be construed as an available maximum bandwidth common to a DL and an UL (for example, in a TDD).

In the example illustrated in FIG. 3, the base station 10 supports an available maximum bandwidth of X MHz (where X is a predetermined numeral). The available maximum bandwidth is, for example, greater than or equal to 1 MHz and less than or equal to 5000 MHz. In this case, 1 MHz is the minimum value of the available maximum bandwidth, and 5000 MHz is the maximum value of the available maximum bandwidth. The minimum value and the maximum value may be defined in advance by a specification.

In the example illustrated in FIG. 3, user equipment UE(A) supports an available maximum bandwidth of 100 MHz, and user equipment UE(B) supports an available maximum bandwidth of 200 MHz, and user equipment UE(C) supports an available maximum bandwidth of 400 MHz.

Each user equipment UE communicates with the base station 10 using a bandwidth in its own available maximum bandwidth. For example, the user equipment UE(C) can communicate with the base station 10 using a bandwidth of 400 MHz or less (for example, 400 MHz and 200 MHz) on the basis of allocation of resources from the base station 100.

As described above, the available maximum bandwidth may be an arbitrary bandwidth within a predetermined range, and granularity may be, for example, a unit of one RB (for example, 180 KHz), a unit of 1 MHz, or a unit of a channel raster (100 KHz). A value other than the values may be used as granularity.

(Operations Until Data Communication is Performed)

Figure 4:
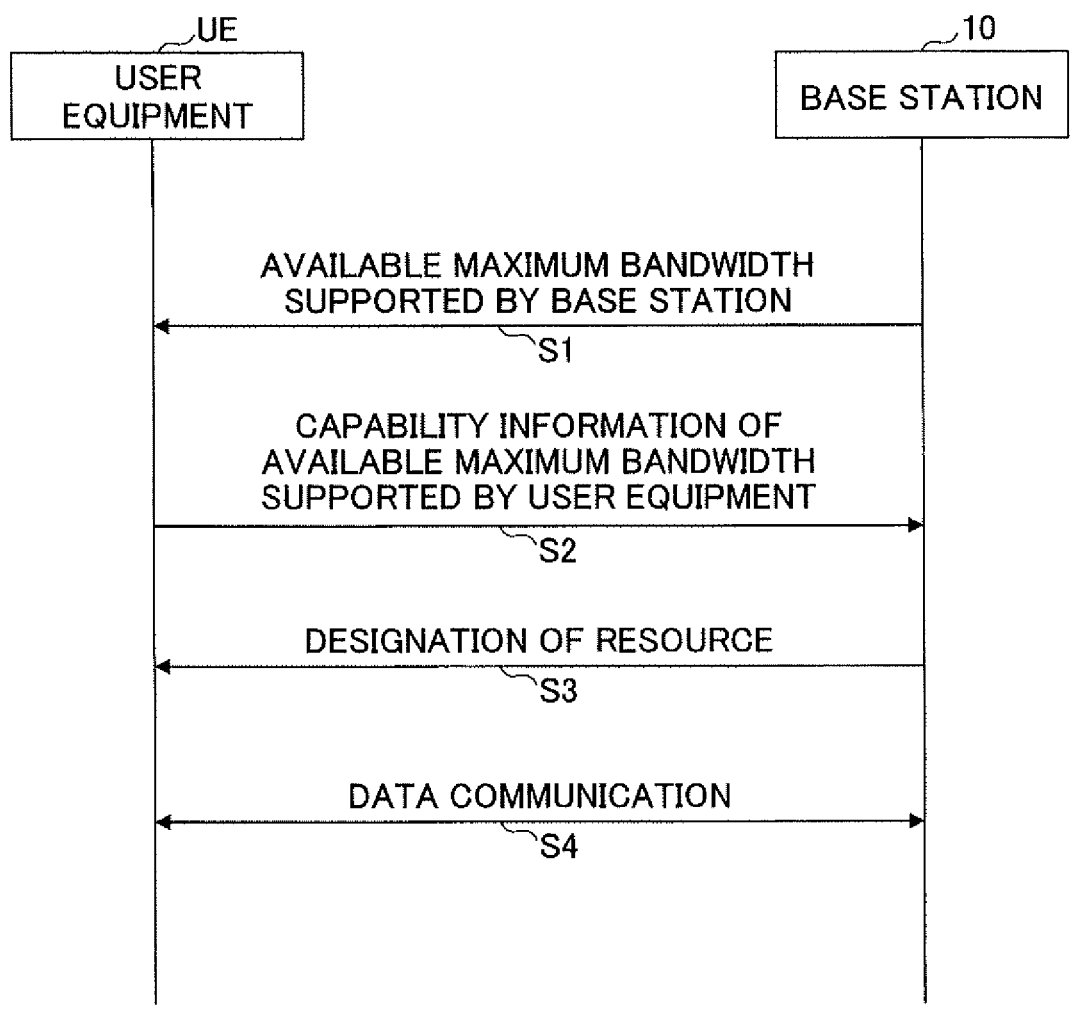
FIG. 4 is a diagram illustrating a whole flow of operations which are performed by the radio communication system according to the embodiment.

An example of a whole flow of operations until data communication is performed in the radio communication system according to this embodiment is described below with reference to the sequence diagram illustrated in FIG. 4.

In Step S1, the base station 10 signals an available maximum bandwidth of the base station 10 to units of user equipment UE. In this embodiment, the signaling is performed by broadcasting system information (Master Information Block (MIB) or System Information Block (SIB)). The signaling may be performed using individual channels to respective units of user equipment. The signaling of the available maximum bandwidth in Step S1 may be performed for each of an available maximum bandwidth of DL and an available maximum bandwidth of UL or may be performed for any one of the available maximum bandwidth of DL and the available maximum bandwidth of UL. When the available maximum bandwidths of UL and DL are the same, the available maximum bandwidth may be broadcasted without distinguishing UL and DL.

In Step S2, user equipment UE reports capability information (UE capability) of an available maximum bandwidth which is supported by the user equipment UE. The reporting of the available maximum bandwidth in Step S2 may be performed for each of an available maximum bandwidth of DL and an available maximum bandwidth of UL or may be performed for any one of the available maximum bandwidth of DL and the available maximum bandwidth of UL. When the available maximum bandwidths of DL and DL are the same, the available maximum bandwidth may be reported without distinguishing UL and DL (in common to UL and DL).

In Step S3, the base station 10 sets, for example, sub-bands to be described later and center frequencies of the sub-bands on the basis of the available maximum bandwidth supported by the base station and the available maximum bandwidth supported by the user equipment, and instructs (allocates) resources in the sub-bands used for communication by the user equipment to the user equipment UE. The instruction is performed, for example, by a physical downlink control channel (PDCCH). In Step S4, the user equipment UE communicates with the base station 10 using the resources instructed from the base station 10 (for example, data transmission or data reception).

(Sub-Band and Center Frequency of Sub-Band)

A detailed example of a resource allocating operation when the available maximum bandwidth of the base station 10 is greater than the available maximum bandwidth of the user equipment UE is described below. The following operation is focused on a specific user equipment UE, but the following operation is performed on a plurality of units of user equipment which are served by the base station 10 depending on capabilities thereof.

When the available maximum bandwidth of the base station 10 is greater than the available maximum bandwidth of the user equipment UE, the base station 10 divides a band of the available maximum bandwidth of the base station 10 into a plurality of sub-bands on the basis of the available maximum bandwidth of the user equipment UE (which has been ascertained by the capability information). Then, one center frequency is determined in one sub-band. That is, the center frequency is fixed in resources in the same sub-band.

Figure 5:
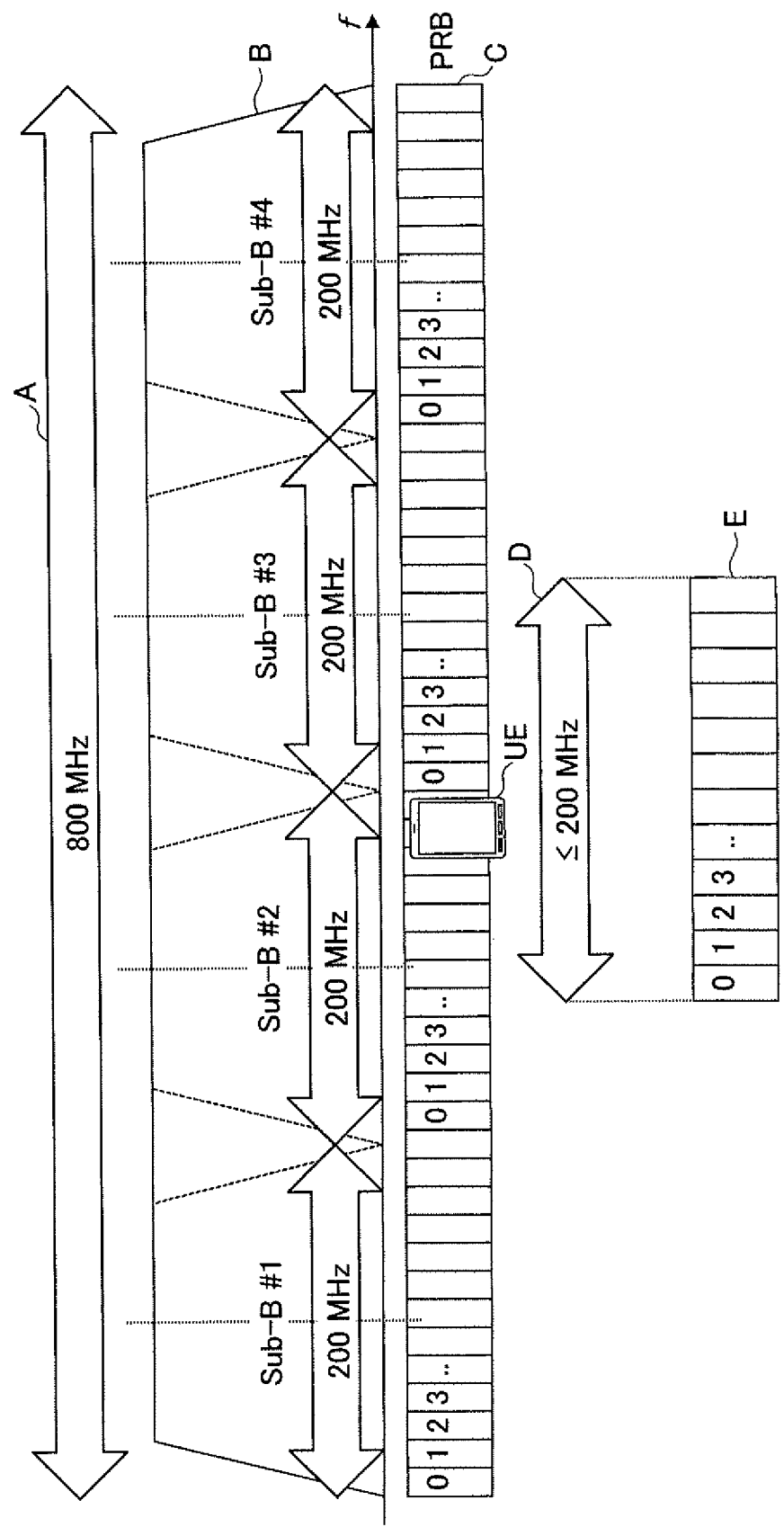
FIG. 5 is a diagram illustrating an example of a configuration of sub-bands.

FIG. 5 illustrates an example of division into sub-bands. FIG. 5 illustrates an example in which the available maximum bandwidth of the base station 10 is 800 MHz and the available maximum bandwidth of the user equipment UE is 200 MHz. As illustrated in FIG. 5, the band with a width of 800 MHz indicated by A is divided into four sub-bands (800÷200) as indicated by B. For example, in user equipment with an available maximum bandwidth of 400 MHz, the band with a width of 800 MHz indicated by A is divided into two sub-bands with a width of 400 MHz. "Divide" includes managing (maintaining) information of the divided sub-bands (information indicating Sub-B #1 to #4 in the example illustrated in FIG. 5).

As indicated by C in FIG. 5, indices of physical resource blocks (PRBs) are added to the sub-bands. The PRB indices in each sub-band are added such that the numerical value (number) of the index increases by one from the PRB of a lowest frequency, for example, as illustrated in FIG. 5. For example, with 12 (or 16) subcarriers as one RB, the indices are added to the PRBs in an ascending order from the PRB of a lowest frequency in the sub-bands. This rule of adding indices is known to both the user equipment UE and the base station 10.

The base station 10 acquires the center frequencies of the sub-bands from a band of the available maximum bandwidth supported by the base station 10 and the available maximum bandwidth supported by the user equipment UE. For example, when the center frequency of a band supported by the base station 10 is 28 GHz, the available maximum bandwidth supported by the base station 10 is 800 MHz, and the available maximum bandwidth supported by the user equipment UE is 200 MHz, the number of sub-bands is four and the center frequencies of the sub-bands can be calculated to be 27700 MHz, 27900 MHz, 28100 MHz, and 28300 MHz from the lowest.

As indicated by B in FIG. 5, in addition to the method of dividing the band and determining the center frequency of each sub-band, the base station 10 may determine an arbitrary frequency in the band of the available maximum bandwidth supported by the base station 10 as the center frequency for the user equipment UE, determine the available maximum bandwidth of the user equipment UE having the center frequency within the capability range of the available maximum bandwidth supported by the user equipment UE, and broadcast the determined center frequencies and the available maximum bandwidths to the user equipment UE. An example of the available maximum bandwidth is indicated by D in FIG. 5. The determined available maximum bandwidth may be referred to as a sub-band. In the example indicated by D in FIG. 5, the center frequency of the available maximum bandwidth supported by the base station 10 is determined as the center frequency for the user equipment US. In this example, the PRB indices are added as indicated by E in FIG. 5.

(Synchronization Signal)

An example of a relationship between synchronization signals and sub-bands when a band is divided on the basis of the available maximum bandwidth of the base station 10 and the available maximum bandwidth of the user equipment UE as described above is described below with reference to FIG. 6.

Figure 6:
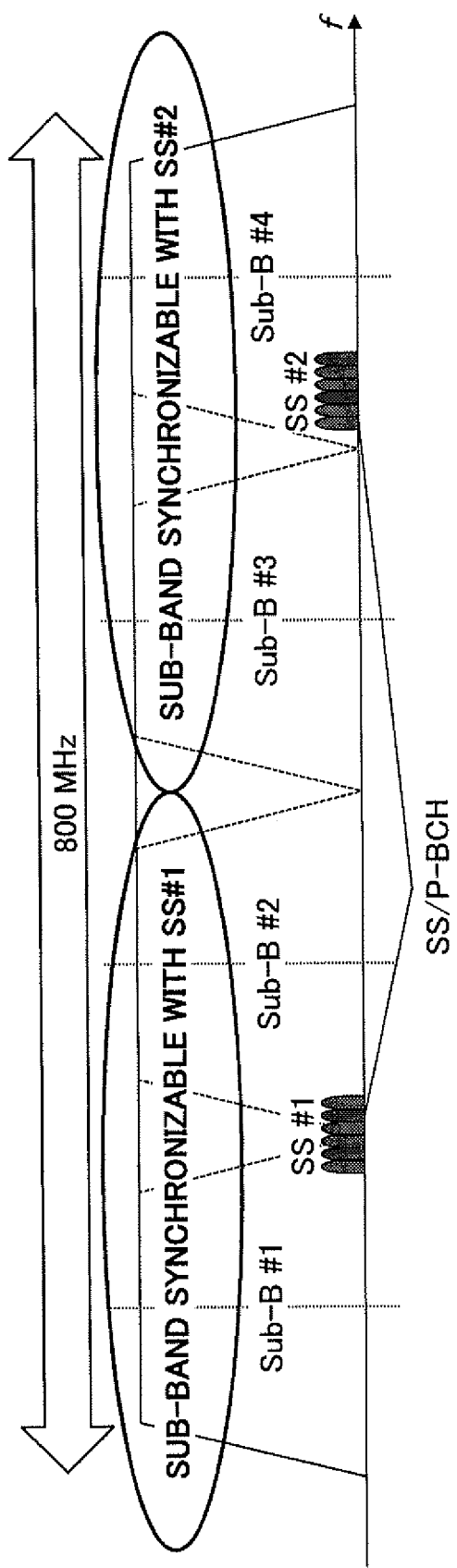
FIG. 6 is a diagram illustrating an example of a relationship between SSs and sub-bands.

FIG. 6 illustrates an example in which the base station 10 transmits synchronization signals in a predetermined bandwidth at two frequency positions in the band of the available maximum bandwidth of the base station 10. In FIG. 6, the synchronization signals at two frequency positions are indicated by SS #1 and SS #2. The number of synchronization signals may be one or three or more.

For example, the user equipment UE knows a bandwidth (for example, six RBs) in which a synchronization signal is transmitted in advance, detects SS #1 or SS #2 transmitted from the base station 10 by searching signals in the bandwidth in the frequency direction, and can be synchronized with the base station 10 using SS #1 or SS #2. Synchronization herein is timing synchronization in the time direction and can be considered to be the same as the timing at which boundaries of radio frames, sub frames, and slots using the synchronization signal. That is, a synchronization signal is a timing reference. Synchronization with the synchronization signal may refer to synchronization with the center frequency of the synchronization signal.

In this embodiment, the synchronization signals are correlated with the sub-bands which can be synchronized by the synchronization signals. In the example illustrated in FIG. 6, for example, SS #1 is correlated with sub-band #1 and sub-band #2, and SS #2 is correlated with sub-band #3 and sub-band #4.

The base station 10 manages (maintains) the correlation between the synchronization signals and the sub-bands which can be synchronized with the synchronization signals, and the base station 10 broadcasts the sub-bands which can be synchronized with the synchronization signals to the user equipment UE using the synchronization signals, physical broadcast channels (P-BCHs) transmitted in the same band as the synchronization signals, or other channels. The base station 10 may broadcast the center frequency of a synchronization signal other than the above-mentioned synchronization signals and a sub-band which can be synchronized with the synchronization signal to the user equipment UE.

For example, in the example illustrated in FIG. 6, when the user equipment UE is synchronized with SS #1, the user equipment UE receives information on sub-bands #1 and #2 which can be synchronized with SS #1 and/or information on the center frequency of SS #2 and sub-bands #3 and #4 which can be synchronized with SS #2 from the base station 10 using SS #1 or P-BCH. For example, when the user equipment UE is synchronized with SS #2, the user equipment UE receives information on sub-bands #3 and #4 which can be synchronized with SS #2 and/or information on the center frequency of SS #1 and sub-bands #1 and #2 which can be synchronized with SS #1 from the base station 10 using SS #2 or P-BCH.

For example, when the user equipment UE is subjected to allocation of resources in sub-band #1 from the base station 10 after the user equipment UE is synchronized with SS #1, the user equipment UE can perform data communication using the resources while using the synchronization with SS #1. When the user equipment UE is subjected to allocation of resources in sub-band #4 from the base station 10 after being synchronized with SS #1, the user equipment UE can detect SS #2 in the center frequency of SS #2 and can perform data communication using the resources in sub-band #4 while using the synchronization with SS #2.

An example of a relationship between the synchronization signals and the sub-bands when the base station 10 determines an arbitrary center frequency and an available maximum bandwidth (a sub-band) and broadcasts the determined center frequency and available maximum bandwidth to the user equipment UE as indicated by D in FIG. 5 is described below. In this case, the base station 10 broadcasts the user equipment UE of the center frequencies of the synchronization signals serving as a timing reference when communication is performed in a band range of the available maximum bandwidth having the determined center frequencies. The signaling of the center frequency of the synchronization signal may be performed at the same time as signaling of the center frequency and the available maximum bandwidth or may be performed separately from signaling of the center frequency and the available maximum bandwidth. As the broadcasting channel, P-BCH may be used or other channels may be used.

<Operation in RRC Idle Mode>

The radio communication system according to this embodiment performs data communication using the above-mentioned communication method. However, since the base station 10 does not ascertain the available maximum bandwidth supported by the user equipment UE until capability information of the user equipment UE is acquired, the base station cannot originally set sub-bands.

In usual LTE, the base station 10 operates to acquire and maintain the capability information of the user equipment UE from the user equipment UE or a core network (MME) when transitioning to an RRC connected state, and to discard the capability information when transitioning to an RRC idle state, and it is assumed that the base station 10 also performs the same operation in 5G. In consideration of this operation, the base station 10 can also be considered to perform division into sub-bands only in the RRC connected state.

Therefore, in this embodiment, the user equipment UE in the RRC idle state can perform various processes which have to be performed in the RRC idle state without recognizing the sub-bands. A sequence of a process of acquiring system information, a camping-on process, a cell reselection process, and a random access (RA) process is described below in detail as various processes which have to be performed by the user equipment UE in the RRC idle state.

(Processing Sequence)

Figure 7:
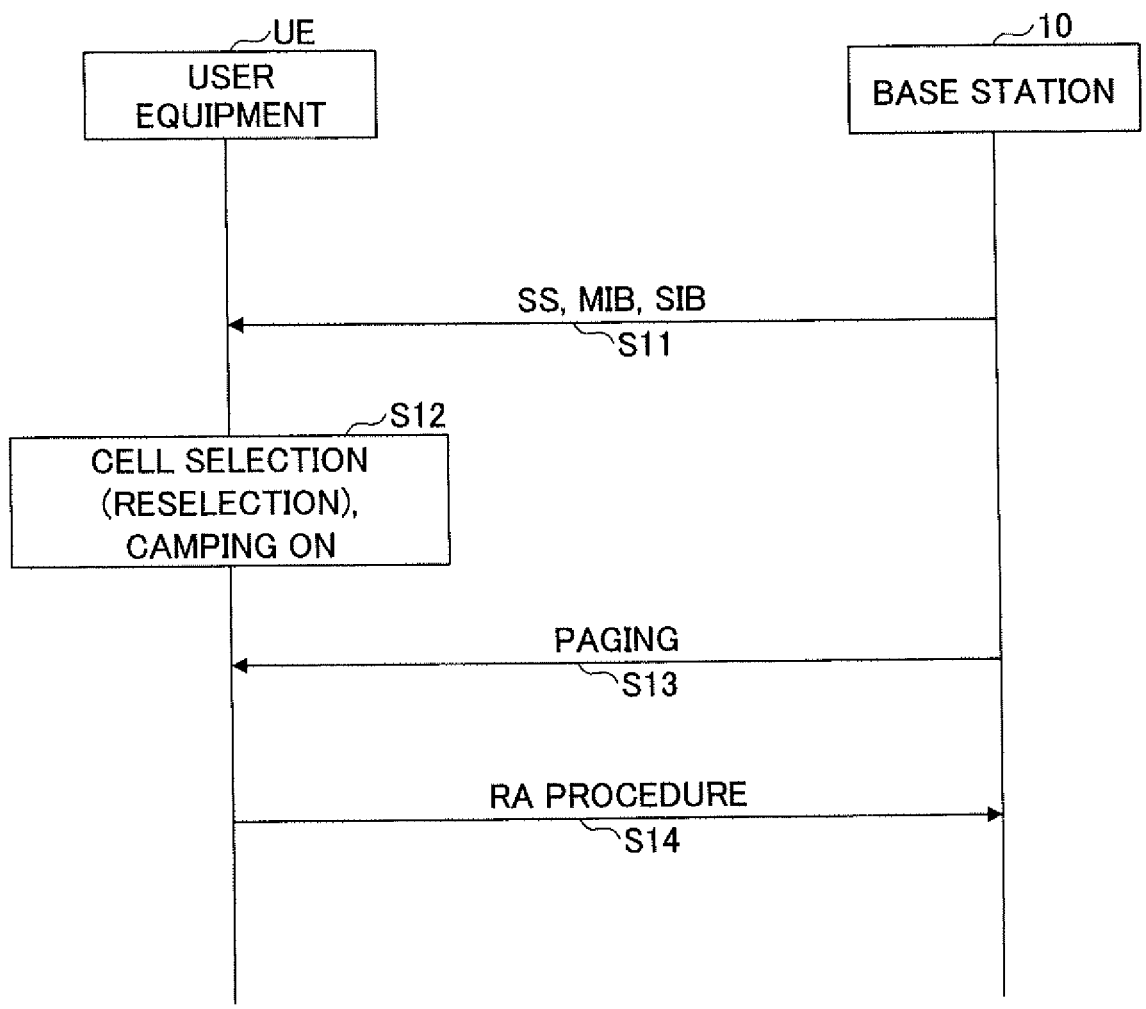
FIG. 7 is a sequence diagram illustrating an example of a procedure executed by the radio communication system according to the embodiment.

FIG. 7 is a sequence diagram illustrating an example of a procedure which is performed by the radio communication system according to this embodiment.

In Step S11, the base station 10 transmits SS and P-BCH (MIB) in a predetermined band which is commonly used by units of user equipment UE communicating with the base station 10. Here, the predetermined band which is commonly used by the units of user equipment UE communicating with the base station 10 is a band with a bandwidth equal to or less than a bandwidth which can be supported by all types of units of user equipment UE having different available maximum bandwidths such as an MBB terminal, an MTC terminal, and an IoT terminal described above and is a band which is set to a predetermined frequency position in the band of the available maximum bandwidth of the base station 10 (or an arbitrary frequency position in the band of the available maximum bandwidth of the base station 10). Hereinafter, the predetermined band is referred to as a "shared band" for the purpose of convenience. The "shared band" may be referred to as another name. For example, in the following description, the "shared band" may be substituted with a "default band," a "band in which SS is transmitted," a "band in which MIB is transmitted," a "band in which SS and MIB are transmitted," a "default sub-band," or the like.

A frequency resource (bandwidth/number of subcarriers/number of PRBs) in which SS is transmitted in the shared band and a frequency resource in which MIB is transmitted may be equal to or different from each other, but it is assumed that the user equipment UE knows a positional relationship between the frequency resource in which SS is transmitted and the frequency resource in which MIB is transmitted in advance. A time resource in which SS is transmitted in the shared band and time resource in which MIB is transmitted may be equal to or different from each other, but it is assumed that the user equipment UE knows a positional relationship between the time resource in which SS is transmitted and the time resource in which MIB is transmitted in advance.

The base station 10 includes information indicating radio resources for transmitting SIB (such as SIB1) in MIB and transmits SIB using the radio resources. The available maximum bandwidth of the band of the radio resources for transmitting SIB is set to a band equal to or less than the bandwidth which can be supported by all types of units of user equipment UE. SIB also includes information indicating radio resources in which Paging Channel (PCH) is set and radio resources in which random access channel (RACH) is set.

In Step S12, the user equipment UE selects (reselects) a suitable cell by performing cell search and camps on the selected cell. The camping on a cell means a state in which an initial access for reception of MIB and SIB, reception (monitoring) of a paging channel, reception of Earthquake and Tsunami Warning System (ETWS) message and Public Warning System (PWS) message, reception of an MBMS service, and establishment of RRC connection can be performed in the conventional LTE specification. Accordingly, in this embodiment, "camping on a cell" means a state in which user equipment UE receives (monitors) at least one of a radio resource in which NIB (MIB with a positional relationship which is known in advance by the user equipment UE) corresponding to the received SS is transmitted, a radio resource in which SIB is transmitted, and a radio resource in which a paging channel (PCH) is transmitted. The process of Step S12 may be performed in any way, and the user equipment UE may camp on a cell, for example, in the following order. First, the user equipment UE detects SS by performing frequency search in an increasing order (or a decreasing order) of frequencies, and specifies a physical cell ID from the detected SS. Here, the user equipment UE may ascertain the frequency position of the shared band in advance or may not ascertain the frequency position of the shared band. When the frequency position of the shared band is ascertained, the user equipment UE can detect SS by performing frequency search in a narrow shared band. On the other hand, when the frequency position of the shared band is not ascertained, the use equipment UE detects SS by performing frequency search in an increasing order (or a decreasing order) of frequencies with respect to a predetermined frequency.

Subsequently, the user equipment UE measures a reference signal and determines whether it is a suitable cell on the basis of the measurement result (that is, whether the measurement result satisfies a predetermined condition). The position of a radio resource of the reference signal used for the measurement is not be particularly limited, and it is assumed that the user equipment UE known a positional relationship between the radio resource in which SS is transmitted and the radio resource in which the reference signal used for the measurement is transmitted in advance. The user equipment UE receives MIB when it is determined to be a suitable cell, recognizes the radio resource of SIB indicated by the received MIB, and receives SIB using the recognized radio resource. Subsequently, the user equipment UE recognizes a radio resource of PCH indicated by the received SIB. Subsequently, the user equipment UE performs a camping-on process by receiving (monitoring) the radio resource of MIB corresponding to the received SS, the radio resource of the recognized SIB, and the radio resource of the recognized PCH while switching radio frequency (RF) if necessary. The switching of RF is not essential. For example, when such radio resources are included in the band of the available maximum bandwidth of all the units of user equipment US, there is a possibility that the radio resources can be received without switching the RF depending on the capability of the user equipment US. On the other hand, when a part of such radio resources is not included in the band of the available maximum bandwidth of the user equipment UE, the user equipment UE receives the radio resources while switching the RF.

In Step S13, when the user equipment UE is an incoming call, the base station 10 transmits a paging signal using PCH to call the user equipment UE.

In Step S14, the user equipment US performs an RA sequence using the RACH resource recognized by the received SIB and transitions to an RRC connected state. After the process of Step S14, the processes of Steps S2 to S4 in FIG. 4 or the processes of Steps S3 and S4 are performed and communication is carried out between the user equipment UE and the base station 10.

(SS, MIS, and SIB)

A specific example of radio resources in which SS, P-BCH (MIB), and SIB are transmitted is described below with reference to FIG. 8. In the example illustrated in FIG. 8, it is assumed that the available maximum bandwidth of the base station 10 is 800 MHz.

In this embodiment, the number of shared bands in which SS and P-BCH (MIB) are transmitted may be set to one or two or more. In the example illustrated in FIG. 8, two shared bands (X1 and X2) are set in the available maximum bandwidth of the base station 10, and SS #1 and P-BCH (MIB) #1, and SS #2 and P-BCH (MIB) #2 are transmitted in the shared bands, respectively. SS is the same as SS described above with reference to FIG. 6.

Figure 8:
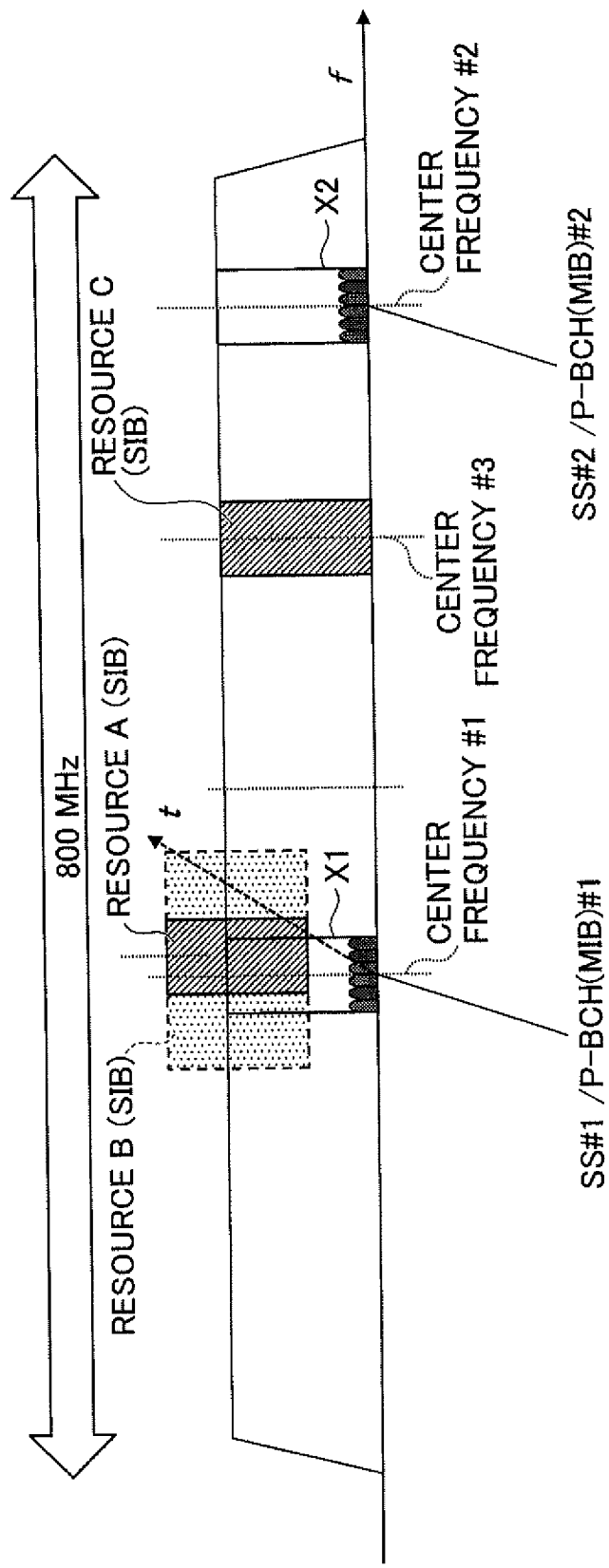
FIG. 8 is a diagram illustrating an example of radio resources with which SS, P-BCH (NIB), and SIB are transmitted.

SIB may be transmitted any time resource and any frequency resource in a physical downlink shared channel (PDSCH), but may be time-multiplexed with SS and P-BCH (MIB) and transmitted in the same center frequency #1 and bandwidth as the shared band, for example, as indicated by resource A in FIG. 8. SIB may be time-multiplexed with SS and P-BCH (MIB) and transmitted using the same center frequency #1 as the shared band and a bandwidth different therefrom as indicated by resource B. SIB may be transmitted at a frequency position different from that of SS and P-BCH (MIS) as indicated by resource C.

MIB includes information indicating the radio resources (time resources and frequency resources) for transmitting SIB (such as SIB1), and one of the time resource and the frequency resource or a part of the time resources and the frequency resources may be omitted. The user equipment UE may consider that the omitted resources are the same as the sources of SS or MIB. Accordingly, it is possible to reduce an amount of data of MIB.

As a specific example, when SIB is time-multiplexed and transmitted with SS and P-BCH (MIB) like resource A, MIB may include information indicating the time in which SIB is transmitted (such as a sub-frame number or a symbol number). In this case, since MIS does not include information indicating a frequency resource, the user equipment UE may consider that SIB is transmitted with the same center frequency and the same bandwidth as SS or MIB.

As another specific example, when SIB is time-multiplexed and transmitted with SS and P-BCH (MIB) with center frequency #1 equal to and a bandwidth different from those of the shared band like resource B, MIB may include information indicating the time in which SIB is transmitted (such as a sub-frame number or a symbol number) and the bandwidth (which may be the number of PRBs or the PRB indices) in which SIB is transmitted. In this case, since MIB does not include information indicating the center frequency of the radio resource in this SIB is transmitted, the user equipment UE may consider that SIB is transmitted with the same center frequency as SS or MIB.

As another specific example, when SIB is transmitted at a frequency position different from those of the SS and the P-BCH (MIB) like resource C, MIB may include the frequency resource in which SIB is transmitted (the center frequency and the bandwidth (which may be the number of PRBs or the PRB indices)) and may not include the time resource. In this case, since MIB does not include the time resource, the user equipment UE may consider that SIB is transmitted using the same time resource as the SS or the MIB.

An MIB or SIB includes information indicating the available maximum bandwidth and the frequency range of the base station 10. When the information is included in the MIB, the information may be an offset value in a frequency decreasing direction and an offset value in a frequency increasing direction with respect to the center frequency of SS transmitted in the same band as the MIB.

(Relationship Between Carrier and Cell)

For example, as described above with reference to FIG. 8, when a plurality of SSs are transmitted in the available maximum bandwidth of the base station 10, physical cell IDs (PCIs) which are specified from signal sequences of the SSs may be different physical cell IDs. An SS includes a primary SS (PSS) and a secondary SS (SSS) and a physical cell ID may be specified by a combination of the PSS and the SSS. The physical cell ID may be specified by only the signal sequence of the PSS or the physical cell ID may be specified by only the signal sequence of the SSS. Here, when physical cell IDs are different from each other, the user equipment UE recognizes that a plurality of cells are present in the available maximum bandwidth of the base station 10. On the other hand, it is premised that the radio communication system according to the embodiment does not bundle up a plurality of carriers like CA, but operates using one carrier (a single carrier). Therefore, in this embodiment, a cell which is identified by a physical cell ID may be referred to as a "virtual cell" such that a plurality of cells are present in one carrier. The term "virtual cell" is not restrictive but another term may be used. In the conventional LTE specification, a cell is a term meaning a combination of a predetermined downlink resource and a predetermined uplink resource. Therefore, in this embodiment, a "virtual cell" may be defined as a "resource of a shared band" on the basis of the conventional LTE specification.

A virtual cell may be defined to include a resource of one or more sub-bands which can be synchronized with an SS (specifically, an SS which is transmitted in a shared band) described above with reference to FIG. 6 in addition to a resource of a shared band. In this embodiment, since user equipment UE in an RRC idle state does not recognize a sub-band, the user equipment UE recognizes a specific resource of the sub-band corresponding to a virtual cell after transitioning to an RRC connected state.

As described in Step S12 in FIG. 7, the user equipment UE (re)selects a suitable cell by performing cell search and camps on the (re)selected cell. The "cell" to be (re)selected in this operation may include a virtual cell. (Re)selection of a virtual cell means a state in which the user equipment US specifies a physical cell ID from the detected SS, measures a reference signal transmitted in a shared band, and determines that the measurement result is good (that is, the measurement result satisfies a predetermined condition) and the cell is a suitable virtual cell. Camping on the (re)selected virtual cell means a state in which the user equipment UE receives (monitors) at least one of the radio resource of the recognized PCH and the radio resource of the selected shared band in a state in which the user equipment UE receives SIB using the radio resource indicted by MIS received using the selected virtual cell (the selected shared band) and recognizes the radio resource of PCH indicated by the received SIB.

When a plurality of SSs are transmitted in the available maximum bandwidth of the base station 10, the physical cell IDs specified from the sequences of the SSs may be the same. In this case, each SS includes a PSS and an SSS and the physical cell ID may be specified by a combination of the PSS and the SSS. The physical cell IDs may be specified by only the sequences of PSSs or the physical cell IDs may be specified by the sequences of SSSs. Accordingly, it is possible to set the same physical cell ID in the available maximum bandwidth of the same base station 10.

(Cell Reselection)

In a usual LTE specification, two types of cell reselection which is performed in cells having the same carrier frequency (intra-frequency) and cell reselection which is performed in cells having different carrier frequencies (inter-frequency) are defined as the cell reselection. In the conventional LTE specification, a carrier frequency means the center frequency of a cell. On the other hand, in this embodiment, a cell to be reselected includes a virtual cell. Therefore, in this embodiment, intra-frequency cell reselection may include reselection of another virtual cell having the same center frequency (that is, the center frequency of a shared band). For example, when user equipment UE selecting a virtual cell corresponding to SS #1 reselects a virtual cell corresponding to SS #3 as illustrated in FIG. 9, this may be referred to as intra-frequency cell reselection.

In this embodiment, inter-frequency cell reselection may include a case in which reselection is performed among a plurality of virtual cells in a selected carrier (which may be referred to as a serving carrier). For example, when user equipment UE selecting a virtual cell corresponding to SS #1 reselects a virtual cell corresponding to SS #2 as illustrated in FIG. 9, this may be referred to as inter-frequency cell reselection.

In order to realize the intra-frequency cell reselection and the inter-frequency cell reselection, for example, the base station 10 may include information indicating the center frequencies of virtual cells as cell reselection candidates in SIB5 and transmit the SIB5. The information indicating the center frequency of a virtual cell may be a specific frequency or may be a value of E-UTRA absolute radio frequency channel number (EARFCN). The base station 10 may add information indicating whether the virtual cell is a virtual cell in the same carrier (the serving carrier) or a virtual cell in a carrier (which may be referred to as a neighboring carrier) other than the serving carrier and/or a specific physical cell ID to the information indicating the center frequency of the virtual cell to the SIB5.

Figure 9:
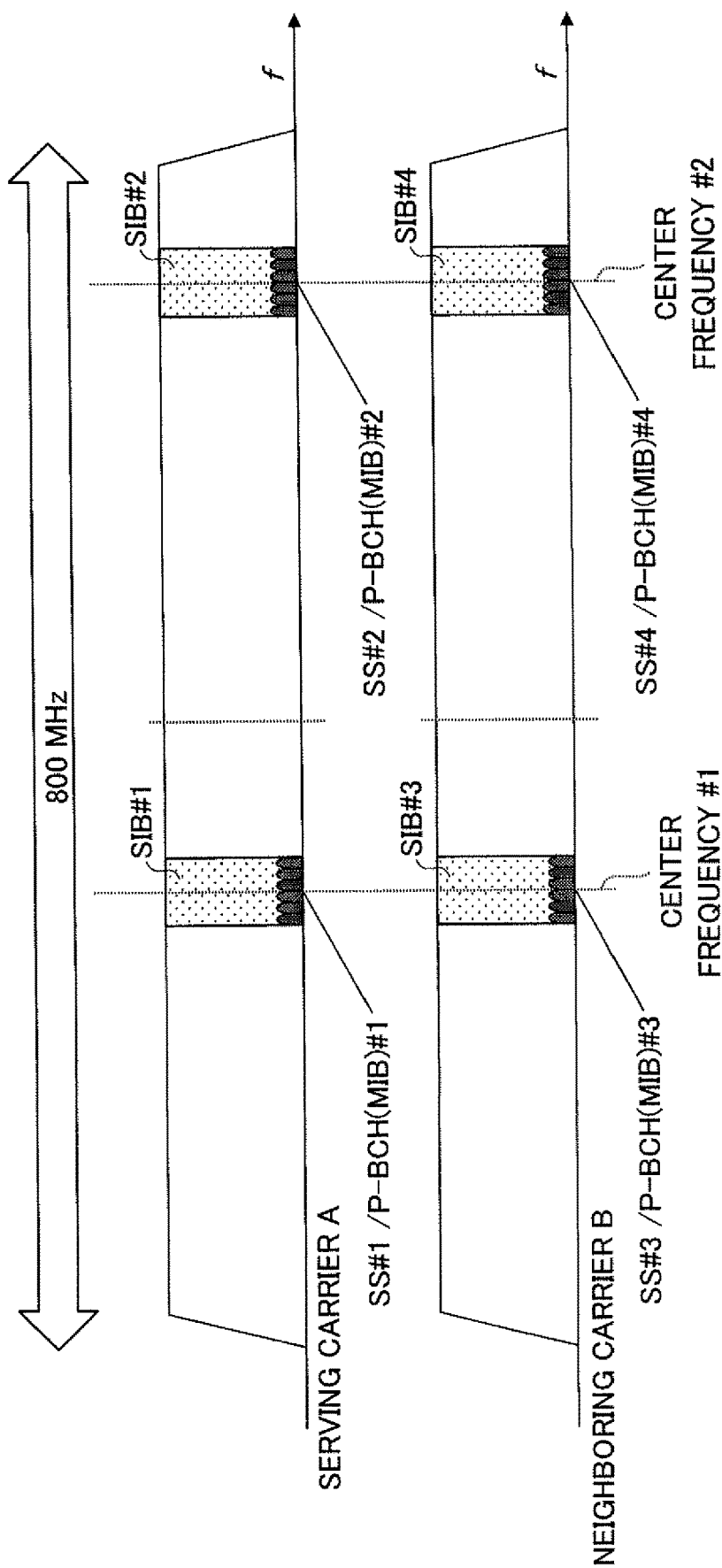
FIG. 9 is a diagram illustrating an example of a cell reselection operation.

For example, in FIG. 9, the base station 10 may include information indicating the center frequency of SS #2, the center frequency of SS #3, and the center frequency of SS #4 in the SIB5 corresponding to the virtual cell of SS #1 and transmit the SIB5. When the user equipment UE selecting the virtual cell of SS #1 is prohibited from reselecting the virtual cell of SS #2, the base station 10 may not include the center frequency of SS #2 in the SIB5 corresponding to the virtual cell of SS #1.

(PCH)

Figure 10:
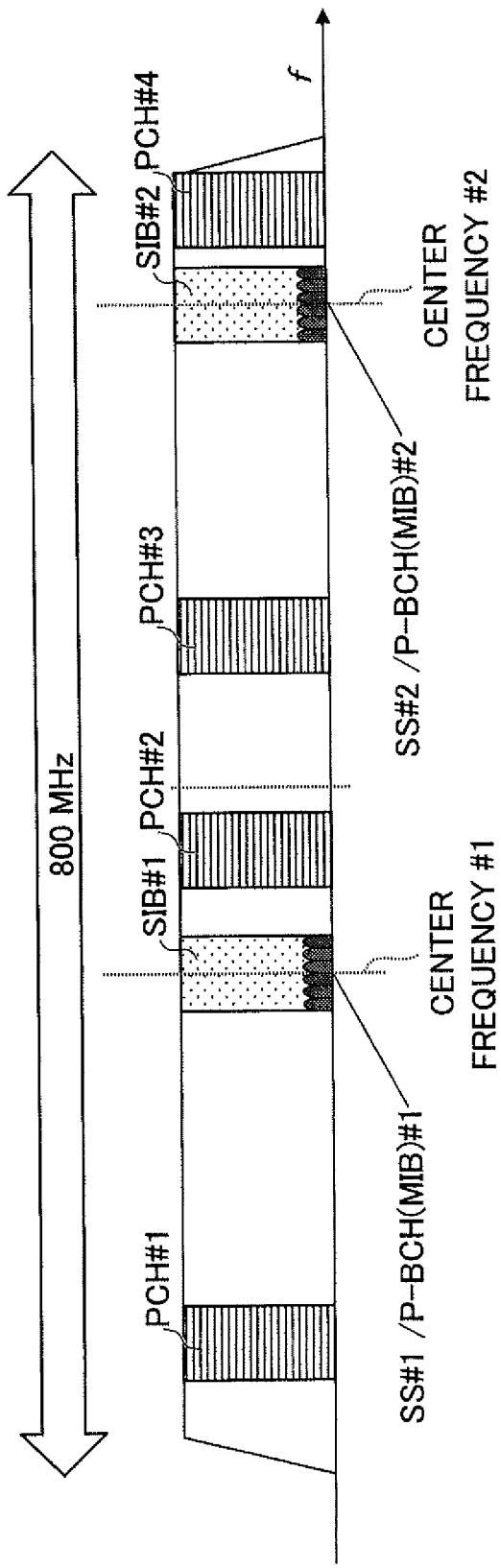
FIG. 10 is a diagram illustrating an example of radio resources in which PCHs are configured.

FIG. 10 is a diagram illustrating an example of radio resources in which a PCH is set. As illustrated in FIG. 10, in this embodiment, a plurality of PCHs may be set in the available maximum bandwidth of the base station 10. A band in which the PCH is set may be same as the band in which the SS is transmitted (with a different time axis) or may be a different band as in the example illustrated in FIG. 10.

As described in Step S12 in FIG. 7, information indicating the radio resource of the PCH is transmitted using the SIB. The information indicating the radio resource of the PCH may include, for example, the center frequency and the bandwidth (which may be the number of PRBs or the PRB indices) of the PCH and the time resource.

As illustrated in FIG. 10, when a plurality of PCHs are set in the available maximum bandwidth of the base station 10 and a plurality of SSs are transmitted, one or more PCHs are correlated with each SS. The correlation between an SS and a PCH is included in the SIB indicated by a P-BCH (MIB) which is transmitted in the same shared band as the SS. For example, when SS #1 and PCH #1 are correlated with each other and SS #2 and PCH #3 are correlated with each other, the base station 10 includes information indicating the radio resource of SIB #1 in MIB #1, includes information indicating the radio resource of PCH #1 in SIB #1, includes information indicating the radio resource of SIB #2 in MIB #2, and includes information indicating the radio resource of PCH #3 in SIB #2. For example, when SS #1 is correlated with PCH #1 and PCH #2 and SS #2 is correlated with PCH #3 and PCH #4, the base station 10 includes information indicating the radio resource of SIB #1 in MIS #1, includes information indicating the radio resources of PCH #1 and PCH #2 in SIB #1, includes information indicating the radio resource of SIB #2 in MIB #2, and includes information indicating the radio resources of PCH #3 and PCH #4 in SIB #2.

When a plurality of PCHs are correlated with one SS, the PCHs which are received (monitored) by the units of user equipment UE may be distributed on the basis of UE-ID (such as IMSI or S-TMSI). For example, numbers from 1 may be given to a plurality of PCHs correlated with one SS and the user equipment UE may receive (monitor) the PCH to which the same number as the value calculated by an expression "UE-ID mod number of PCHs" is given.

The units of user equipment UE may be distributed in the PCHs corresponding to different SSs. For example, by including information for forcibly starting the inter-frequency cell reselection in the same carrier for a specific user equipment UE in an MIB, an SIB', or an SIB3, the PCH received (monitored) by the specific user equipment UE may be distributed in the SSs. For example, in FIG. 10, it is assumed that SS #1 is correlated with PCH #1 and PCH #2 and SS #2 is correlated with PCH #3 and PCH #4. In this case, by including information for forcibly starting the cell reselection to the virtual cell of SS #2 for a specific user equipment UE in MIB #1 or SIB #1, the specific user equipment UE receives (monitors) PCH #3 or PCH #4. Accordingly, the number of units of user equipment UE can be distributed in a plurality of PCHs correlated with different SSs.

(RACH)

Figure 11:
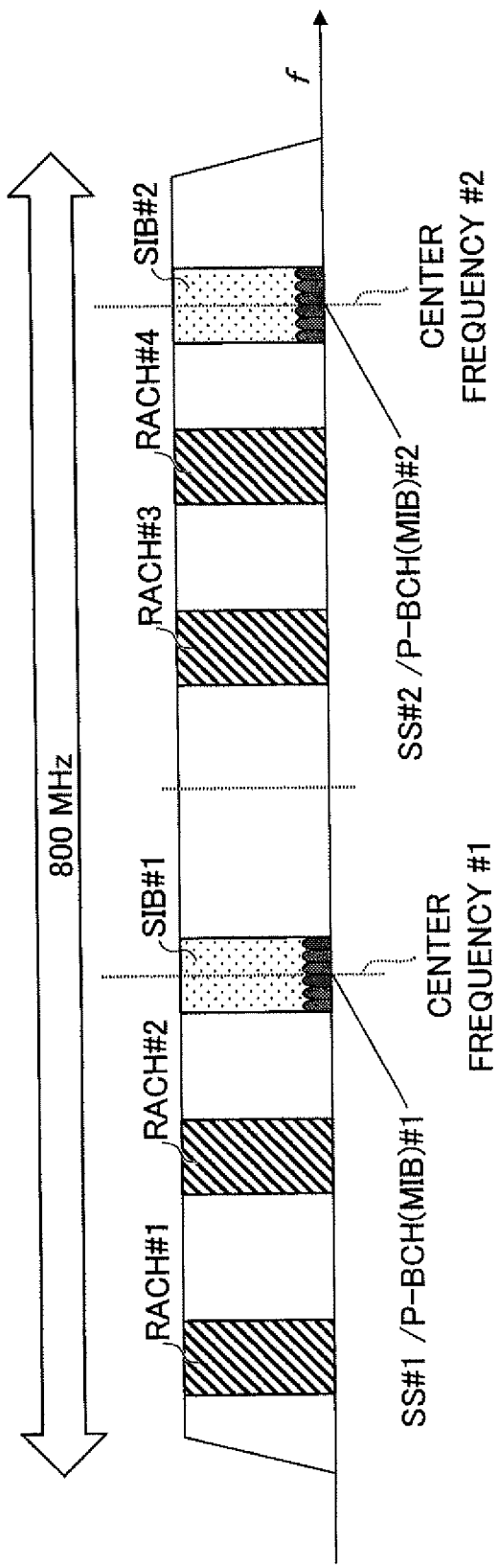
FIG. 11 is a diagram illustrating an example of radio resources in which RACHs are configured.

FIG. 11 is a diagram illustrating an example of radio resources in which a RACE is set. As illustrated in FIG. 11, in this embodiment, a plurality of RACHs may be set in the available maximum bandwidth of the base station 10. A band in which the RACE is set may be same as the band in which the SS is transmitted (with a different time axis) or may be a different band as in the example illustrated in FIG. 11.

As described in Step S12 in FIG. 7, information indicating the radio resource of the RACH is transmitted using the SIB or may be fixedly determined in advance in the standard specification or the like. The information indicating the radio resource of the RACE may include, for example, the center frequency and the bandwidth (which may be the number of PRBs or the PRB indices) of the RACH and the time resource.

As illustrated in FIG. 11, when a plurality of RACHs are set in the available maximum bandwidth of the base station 10 and a plurality of SSs are transmitted, one or more RACHs are correlated with each SS. The correlation between an SS and a RACH is included in the SIB indicated by a P-BCH (MIB) which is transmitted in the same shared band as the SS. For example, when SS #1 and RACH #1 are correlated with each other and SS #2 and RACH #3 are correlated with each other, the base station 10 includes information indicating the radio resource of SIB #1 in MIB #1, includes information indicating the radio resource of RACH #1 in SIB #1, includes information indicating the radio resource of SIB #2 in MIB #2, and includes information indicating the radio resource of RACH #3 in SIB #2.

When a plurality of RACHs are correlated with one SS, the RACHs which are used by the units of user equipment UE may be distributed on the basis of UE-ID (such as IMSI or S-TMSI). For example, numbers from 1 may be given to a plurality of RACHs correlated with one SS and the user equipment UE may use the RACE to which the same number as the value calculated by an expression "UE-ID mod number of RACHs" is given. In another method, the base station 10 may include RACH distribution information in an SIB2 and transmit the SIB2. The RACH distribution information is information which can be used for user equipment UE to specify an RACH which is used by the user equipment UE and is, for example, correlation between a range of UE-ID and radio resources of the RACHs. Accordingly, the number of units of user equipment UE using the RACHs can be distributed in a plurality of RACHs correlated with different SSs.

<Functional Configuration>

(User Equipment)

Figure 12:
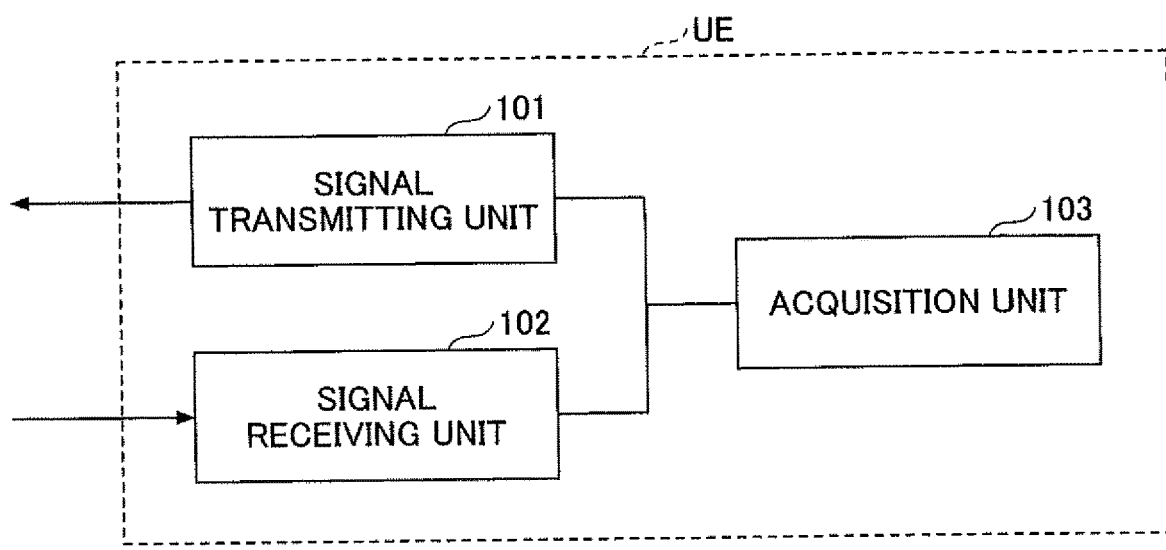
FIG. 12 is a diagram illustrating an example of a functional configuration of user equipment according to the embodiment.

FIG. 12 is a diagram illustrating an example of a functional configuration of user equipment according to the embodiment. As illustrated in FIG. 12, the user equipment UE includes a signal transmitting unit 101, a signal receiving unit 102, and an acquisition unit 103. FIG. 12 illustrates only functional units, which are particularly associated with the invention, in the user equipment UE, and the user equipment UE also has at least a function, which is not illustrated, for performing operations based on the LTE (which includes 5G).

The signal transmitting unit 101 has a function of generating various signals of a physical layer from a signal of an upper layer to be transmitted from the user equipment UE and wirelessly transmitting the generated signals. The signal receiving unit 102 has a function of wirelessly receiving various signals from the base station 10 and acquiring a signal of an upper layer from the received signals of the physical layer.

An SIB includes a radio resource of an RACH which is used by the user equipment UE among a plurality of RACHs set in the available maximum bandwidth of the base station 10, and the signal transmitting unit 101 has a function of transmitting a random access preamble (performing an RA sequence) using the radio resource of the RACH which is used by the user equipment.

The signal receiving unit 102 has a function of receiving a radio signal transmitted from the base station 10 in the band of the available maximum bandwidth of the base station 10. The signal receiving unit 102 has a function of monitoring the radio resource of an SS received by the signal receiving unit 102 among one or more SSs transmitted in the band of the available maximum bandwidth of the base station 10, the radio resource of an MIB acquired by the acquisition unit 103, radio resource of an SIB, or the radio resource of a PCH in an RRC idle state.

The acquisition unit 103 has a function of acquiring a radio resource of an MIB corresponding to an SS received by the signal receiving unit 102 among one or more SSs transmitted in the band of the available maximum bandwidth of the base station 10, a radio resource of an SIB indicted by the MIB received by the signal receiving unit 102, and a radio resource of a PCH indicated by the MIB received by the signal receiving unit 102 or the SIB. The acquisition unit 103 may acquire the radio resource of the MIB corresponding to the SS received by the signal receiving unit 102 using a "positional relationship between the radio resource in which the SS is transmitted and the radio resource in which the MIB is transmitted" stored in the user equipment UE.

The signal receiving unit 102 may receive an SS and an MIB which are transmitted in one or more predetermined bands (shared bands) which are bands commonly used by the units of user equipment communicating with the base station 10 in the band of the available maximum bandwidth of the base station 10, an SIB transmitted in the radio resource indicated by the MIB, or a PCH indicated by the MIB or the SIB.

The SS and the MIB are transmitted in a plurality of shared bands in the band of the available maximum bandwidth of the base station 10, the SSs transmitted in the plurality of shared bands are correlated with different physical cell IDs, and the signal receiving unit 102 may receive the SSs transmitted in any one band of the plurality of shared bands by searching the band of the available maximum bandwidth of the base station 10 and recognize the physical cell IDs from the received SSs.

The signal receiving unit 102 may receive another SS and another MIB which are transmitted in any one band of the plurality of shared bands, another SIB which is transmitted in the radio resource indicated by the MIB, or a PCH indicated by the other MIB or the other SIB by performing a cell reselection process in the band of the available maximum bandwidth of the base station 10 on the basis of information indicating the center frequency of any one shared band of the plurality of shared bands, the information being included in the MIB.

Information indicating the center frequency of any one shared band of a plurality of shared bands is included in an SIB, and the acquisition unit 103 may acquire a radio resource of another MIB corresponding to another SS received in any one shared band of the plurality of shared bands by the signal receiving unit 102, a radio resource of another SIB indicted by the other MIB received by the signal receiving unit 102, and a radio resource of another PCH indicated by the other MIB received by the signal receiving unit 102 or the other SIB by performing the cell reselection process in the band of the available maximum bandwidth of the base station 10 on the basis of the information. The acquisition unit 103 may acquire the radio resource of the other MIB corresponding to the other SS received by the signal receiving unit 102 using a "positional relationship between the radio resource in which the SS is transmitted and the radio resource in which the MIB is transmitted" stored in the user equipment UE.

The signal receiving unit 102 may monitor the radio resource of the other SS, the radio resource of the other MIB, the radio resource of the other SIB, or the radio resource of the other PCH acquired by the acquisition unit 103 when the user equipment UE is in the RRC idle mode.

The MIB indicates a time resource in which the SIB is transmitted, a frequency resource in which the SIB is transmitted, or a time resource and a frequency resource in which the SIB is transmitted, and the signal receiving unit 102 may consider that the SIB is transmitted in the same frequency resource as the SS or the MIB when the frequency resource in which the SIB is transmitted is not included in the MIS and may consider that the SIB is transmitted in the same time resource as the SS or the MIB when the time resource in which the SIB is transmitted is not included in the MIB.

(Base Station)

Figure 13:
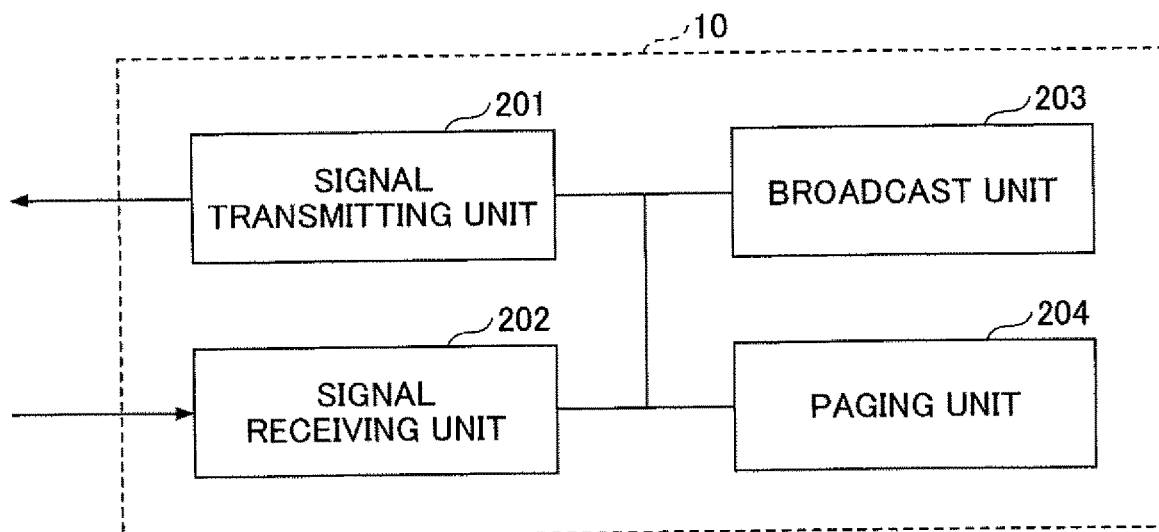
FIG. 13 is a diagram illustrating an example of a functional configuration of a base station according to the embodiment.

FIG. 13 is a diagram illustrating an example of a functional configuration of a base station according to the embodiment. As illustrated in FIG. 13, the base station 10 includes a signal transmitting unit 201, a signal receiving unit 202, a broadcast unit 203, and a paging unit 204. FIG. 13 illustrates only functional units, which are particularly associated with the embodiment of the invention, in the base station 10, and the base station 10 also has at least a function, which is not illustrated, for performing operations based on the LTE (which includes 5G).

The signal transmitting unit 201 has a function of generating various signals of a physical layer from a signal of an upper layer to be transmitted from the base station 10 and wirelessly transmitting the generated signals. The signal receiving unit 202 has a function of wirelessly receiving various signals from the user equipment UE and acquiring a signal of an upper layer from the received signals of the physical layer.

The broadcast unit 203 has a function of transmitting one or more SSs, MIBs, and SIBs in the band of the available maximum bandwidth of the base station 10.

The paging unit 204 has a function of transmitting paging information in a PCH which is set in the band of the available maximum bandwidth of the base station 10. The paging unit 204 may enlarge the PCH range for transmitting the paging information and transmit the paging information, when there is no response to the paging information from the user equipment UE.

<Hardware Configuration>

The block diagrams (FIGS. 12 and 13) which are used above to describe the embodiments illustrate blocks in the units of functions. The functional blocks (constituent units) are embodied in an arbitrary combination of hardware and/or software. Means for embodying the functional blocks is not particularly limited. That is, the functional blocks may be embodied by one unit which is physically and/or logically coupled or may be embodied by two or more units which are physically and/or logically separated and which are connected directly and/or indirectly (for example, in a wired and/or wireless manner).

Figure 14:
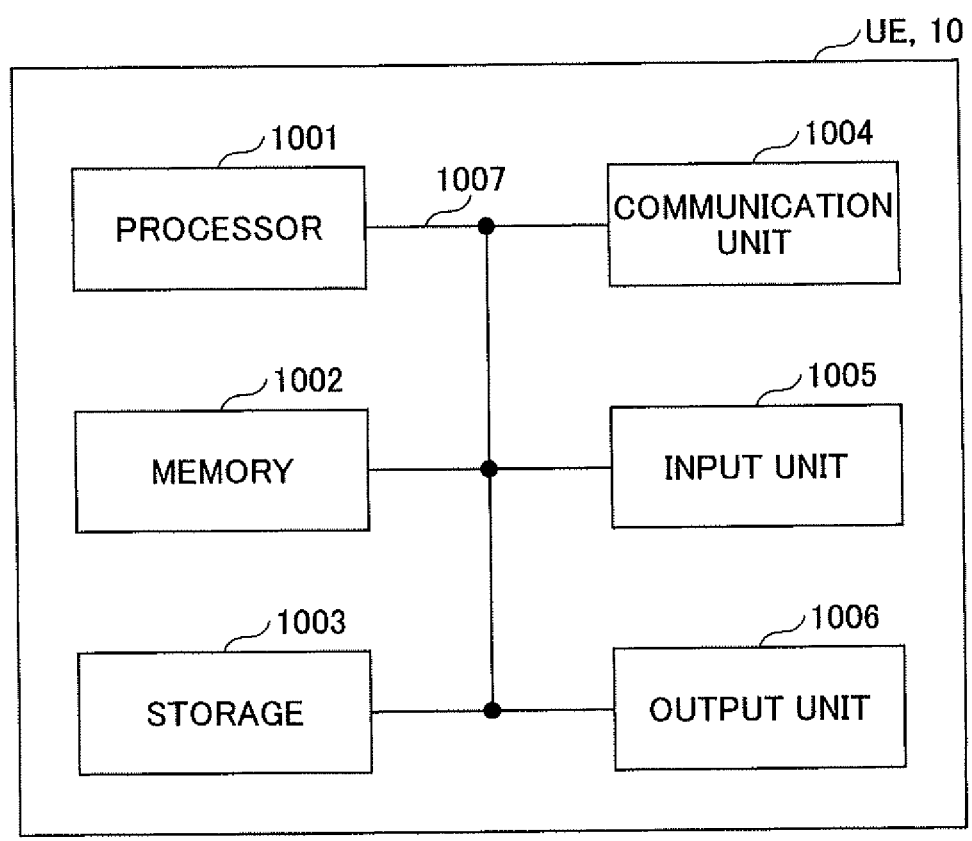
FIG. 14 is a diagram illustrating an example of a hardware configuration of each of the user equipment and the base station according to the embodiment.

For example, the user equipment UE and the base station 10 in the embodiment may function as computers that perform the processes of the camping-on method according to the invention. FIG. 14 is a diagram illustrating an example of a hardware configuration of the user equipment and the base station according to the embodiment. The user equipment UE and the base station 10 may be physically configured as a computer device including a processor 1001, a memory 1002, a storage 1003, a communication unit 1004, an input unit 1005, an output unit 1006, and a bus 1007.

In the following description, a word "unit" may be referred to as a circuit, a device, a unit, or the like. The hardware configurations of the user equipment UE and the base station 10 may include one or more units illustrated in the drawing or may not include some units.

The functions of the user equipment UE and the base station 10 are realized by causing hardware such as the processor 1001 and the memory 1002 to read predetermined software (a program) and causing the processor 1001 to perform computation and to control communication of the communication unit 1004 and reading and/or writing of data in the memory 1002 and the storage 1003.

The processor 1001 controls the computer as a whole, for example, by activating an operating system. The processor 1001 may be constituted by a central processing unit (CPU) including an interface with peripherals, a control unit, a calculation unit, a register, and the like. For example, the signal transmitting unit 101, the signal receiving unit 102, and the acquisition unit 103 of the user equipment UE and the signal transmitting unit 201, the signal receiving unit 202, the broadcast unit 203, and the paging unit 204 of the base station 10 may be embodied by the processor 1001.

The processor 1001 reads a program (program codes), a software module, or data from the storage 1003 and/or the communication unit 1004 to the memory 1002 and performs various processes in accordance therewith. As the program, a program causing a computer to perform at least a part of the operations described above in the embodiment is used. For example, the signal transmitting unit 101, the signal receiving unit 102, and the acquisition unit 103 of the user equipment UE and the signal transmitting unit 201, the signal receiving unit 202, the broadcast unit 203, and the paging unit 204 of the base station 10 may be embodied by a control program which is stored in the memory 1002 and operated by the processor 1001 or the other functional blocks may be similarly embodied. Various processes described above have been described to be performed by a single processor 1001, but may be simultaneously or sequentially performed by two or more processors 1001. The processor 1001 may be mounted as one or more chips. The program may be transmitted from a network via an electric communication line.

The memory 1002 is a computer-readable recording medium and may be constituted, for example, by at least one of a read only memory (ROM), an erasable programmable ROM (EPROM), an electrically erasable programmable ROM (EEPROM), and a random access memory (RAM). The memory 1002 may be referred to as a register, a cache, or a main memory (a main storage unit). The memory 1002 can store a program (program codes), a software module, or the like which can be executed to perform the camping-on method according to the embodiment.

The storage 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, and a magnetic strip. The storage 1003 may be referred to as an auxiliary storage unit. Examples of the recording medium may include a database including the memory 1002 and/or the storage 1003, a server, and another appropriate medium.

The communication unit 1004 is hardware (a transceiver device) that allows communication between computers via a wired and/or wireless network and is referred to as, for example, a network device, a network controller, a network card, or a communication module. For example, the signal transmitting unit 101 and the signal receiving unit 102 of the user equipment UE and the signal transmitting unit 201 and the signal receiving unit 202 of the base station 10 may be embodied by the communication unit 1004.

The input unit 1005 is an input device (such as a keyboard, a mouse, a microphone, a switch, a button, or a sensor) that receives an input from the outside. The output unit 1006 is an output device (such as a display, a speaker, or an LED lamp) that performs outputting to the outside. The input unit 1005 and the output unit 1006 may be configured as a unified body (such as a touch panel).

The units such as the processor 1001 and the memory 1002 are connected to each other via the bus 1007 for transmitting and receiving information. The bus 1007 may be constituted by a single bus or may be configured by different buses for the units.

The user equipment UE and the base station 10 may be configured to include hardware such as a microprocessor, a digital signal processor (DSP), an application specific integrated circuit (ASIC), a programmable logic device (PLD), or a field programmable gate array (FPGA), or a part or all of the functional blocks may be embodied by the hardware. For example, the processor 1001 may be mounted as at least one hardware module.

CONCLUSION

According to the above-mentioned embodiment, there is provided user equipment in a radio communication system including a base station that performs communication using a maximum bandwidth which is a largest bandwidth available for communication and units of user equipment in which a largest bandwidth available for communication is equal to or less than the maximum bandwidth, the user equipment including: a receiver unit configured to receive a radio signal transmitted from the base station within a band of the maximum bandwidth; and an acquisition unit configured to acquire a radio resource of a master information block corresponding to a synchronization signal received by the receiver unit among one or more synchronization signals transmitted in a band of the maximum bandwidth, a radio resource of a system information block indicated by the master information block received by the receiver unit, and a radio resource of a paging channel indicated by the master information block or the system information block received by the receiver unit, in which the receiver unit monitors the radio resource of the received synchronization signal, the radio resource of the master information block, the radio resource of the system information block, or the radio resource of the paging channel in an RRC idle state. According to the user equipment UE, it is possible to provide a technique for enabling even user equipment in an RRC idle state to appropriately perform a communication process even in an environment in which units of user equipment supporting various bandwidths equal to or less than a bandwidth with which a base station can communicate.

The synchronization signal and the master information block may be transmitted in a plurality of predetermined bands which are bands used commonly by units of user equipment communicating with the base station within a band of the maximum bandwidth, the one or more synchronization signals may be associated with different physical cell IDs, and the receiver unit may receive the synchronization signal transmitted in any one of the plurality of predetermined bands by searching the band of the maximum bandwidth and recognizes the physical cell ID from the received synchronization signal. As a result, the user equipment UE can recognize a plurality of virtual cells in the maximum bandwidth of the base station 10.

The system information block may include information indicating a center frequency of any one band of the plurality of predetermined bands, the acquisition unit may acquire a radio resource of another master information block corresponding to another synchronization signal received in any one band of the plurality of predetermined bands by the receiver unit by performing a cell reselection process in the band of the maximum bandwidth on the basis of the information, a radio resource of another system information block indicated by the other master information block received by the receiver unit, and a radio resource of another paging channel indicated by at least one of the other master information block and the other system information block received by the receiver unit, and the receiver unit may monitor at least one of the radio resource of the other synchronization signal, the radio resource of the other master information block, the radio resource of the other system information block, and the radio resource of the other paging channel, when the user equipment is in an RRC idle mode. As a result, the user equipment UE can perform a cell reselection process among a plurality of virtual cells included in the maximum bandwidth of the base station 10.

The master information block may indicate at least one of a time resource in which the system information block is transmitted, a frequency resource in which the system information block is transmitted, and a time resource and a frequency resource in which the system information block is transmitted, and the receiver unit may consider that the system information block is transmitted in the same frequency resource as at least one of the synchronization signal and the master information when the master information block does not indicate the frequency resource on which the system information block is transmitted, and may consider that the system information block is transmitted in the same time resource as at least one of the synchronization signal and the master information block when the master information block does not indicate the time resource in which the system information block is transmitted. As a result, when an MIB and an SIB are transmitted using the same frequency resource, it is possible to reduce an amount of information of the MIB.

The system information block may indicate a radio resource of a random access channel which is to be used by the user equipment among a plurality of random access channels set in the band of the maximum bandwidth, and the user equipment may further include a transmitter unit configured to transmit a random access preamble in the radio resource of the random access channel which is to be used by the user equipment. Accordingly, the base station 10 can broadcast an RACH resource to the user equipment UE and the user equipment UE can perform an RA sequence using the broadcasted RACH.

According to the embodiment, there is also provided a camping-on method which is performed by user equipment of a radio communication system including a base station that performs communication using a maximum bandwidth which is a largest bandwidth available for communication and the user equipment in which a largest bandwidth available for communication is equal to or less than the maximum bandwidth, the camping-on method including: receiving, by a receiver unit, a radio signal transmitted from the base station within a band of the maximum bandwidth; acquiring a radio resource of a master information block corresponding to a synchronization signal received by the receiver unit among one or more synchronization signals transmitted in a band of the maximum bandwidth, a radio resource of a system information block indicated by the master information block received by the receiver unit, and a radio resource of a paging channel indicated by at least one of the master information block and the system information block received by the receiver unit; and monitoring, by the receiver unit, the radio resource of the received synchronization signal, the radio resource of the master information block, the radio resource of the system information block, or the radio resource of the paging channel, which are received by the receiver unit, when the user equipment is in an Radio Resource Control (RRC) idle mode. According to the camping-on method, a technique is provided that allows, in particular, user equipment in an RRC IDLE mode to appropriately execute communication process, in an environment in which units of user equipment coexist, which support various bandwidths less than or equal to a bandwidth with which a base station can communicate.

Supplemental Embodiments

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, the flowcharts, and the like of the aspects/embodiments described above in this specification may be changed in the order as long as they are not incompatible with each other. For example, in the methods described in this specification, various steps as elements are described in an exemplary order and the methods are not limited to the described order.

Specific operations which are performed by the base station in this specification may be performed by an upper node thereof in some cases. In a network including one or more network nodes including a base station, various operations which are performed to communicate with a terminal can be apparently performed by the base station and/or network nodes (for example, an MME or an S-GW can be considered but the network nodes are not limited thereto) other than the base station. A case in which the number of network nodes other than the base station is one has been described above, but a combination of plural different network nodes (for example, an MME and an S-GW) may be used.

The terms "system" and "network" which are used in this specification are compatibly used.

Since various channels (for example, PCH, P-BCH, or RACH) and information (for example, MIB or SIB) described above can be identified by all suitable names, various names given to various channels and information elements are not restrictive in any respect.

The user equipment UE may also be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The terms "determining" and "determination" which are used in this specification may include various types of operations. The terms "determining" and "determination" may include that judging, calculating, computing, processing, deriving, investigating, looking up (for example, looking up in a table, a database, or another data structure), and ascertaining are considered to be "determined." The terms "determining" and "determination" may include that receiving (for example, receiving of information), transmitting (for example, transmitting of information), input, output, and accessing (for example, accessing data in a memory) are considered to be "determined." The terms "determining" and "determination" may include that resolving, selecting, choosing, establishing, and comparing are considered to be "determined." That is, the terms "determining" and "determination" can include that a certain operation is considered to be "determined."

An expression "on the basis of" which is used in this specification does not refer to only "on the basis of only," unless apparently described. In other words, the expression "on the basis of" refers to both "on the basis of only" and "on the basis of at least."

So long as terms "include" and "including" and modifications thereof are used in this specification or the appended claims, the terms are intended to have a comprehensive meaning similar to a term "comprising." A term "or" which is used in this specification or the claims is intended not to mean an exclusive logical sum.

In the entire disclosure, for example, when an article such as a, an, or the is added in translation into English, such an article refers to including the plural unless otherwise recognized from the context.

The aspects described in this specification may be used alone, may be used in combination, or may be switched with implementation thereof. Signaling of predetermined information is not limited to explicit signaling, but may be performed by implicit signaling (for example, signaling of the predetermined information is not performed).

Input and output information and the like may be stored in a specific location (for example, a memory) and may be managed by a management table. The input and output information and the like may be overwritten, updated, or rewritten. The output information and the like may be erased. The input information and the like may be transmitted to other apparatuses.

Determination may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The present invention is described in detail above. It is apparent to a person ordinarily skilled in the art that the present invention is not limited to the embodiments described in the specification. The present invention can be implemented as modifications and alterations without departing from the gist and scope of the present invention that are determined by the descriptions of the claims. Accordingly, the descriptions of the present specification is for the purpose of illustration and does not have any restrictive meaning to the present invention.

This international patent application is based on and claims priority to Japanese Patent Application No. 2016-207391 filed on Oct. 21, 2016, and the entire content of Japanese Patent Application No. 2016-207391 is incorporated herein by reference.

LIST OF REFERENCE SYMBOLS

UE user equipment
10 base station
101 signal transmitting unit
102 signal receiving unit
103 acquisition unit
201 signal transmitting unit
202 signal receiving unit
203 broadcast unit
204 paging unit
1001 processor
1002 memory
1003 storage
1004 communication unit
1005 input unit
1006 output unit

The invention claimed is:

1. A terminal comprising:
a receiver unit configured to receive a synchronization signal and a master information block corresponding to the synchronization signal in a cell; and
an acquisition unit configured to acquire information related to a radio resource of a system information block included in the master information block received by the receiver unit and information related to a radio resource for monitoring paging,
wherein the receiver unit receives the system information block when the terminal is in a Radio Resource Control (RRC) idle mode,
wherein the system information block indicates a frequency resource,
wherein a bandwidth of the frequency resource is less than or equal to a bandwidth of the cell, and
wherein the monitoring of the paging is performed on the frequency resource.

2. The terminal according to claim 1,
wherein the synchronization signal and the master information block are transmitted in a predetermined band, and
wherein the receiver unit recognizes a physical cell ID from the received synchronization signal.

3. The terminal according to claim 2,
wherein the system information block includes information indicating a center frequency of the predetermined band.

4. The terminal according to claim 1,
wherein the system information block indicates a radio resource of a random access channel which is to be used by the terminal.

5. A camping-on method which is to be executed by a terminal, the camping-on method comprising:
receiving a synchronization signal and a master information block corresponding to the synchronization signal in a cell;

acquiring information related to a radio resource of a system information block included in the received master information block received and information related to a radio resource for monitoring paging; and receiving the system information block when the terminal is in a Radio Resource Control (RRC) idle state, wherein the system information block indicates a frequency resource, wherein a bandwidth of the frequency resource is less than or equal to a bandwidth of the cell, and wherein the monitoring of the paging is performed on the frequency resource.

6. A base station comprising:

a control unit that includes, in a master information block, information related to a radio resource of a system information block including information related to a radio resource for monitoring paging; and a transmitting unit that transmits a synchronization signal and the master information block corresponding to the synchronization signal in a cell, wherein the transmitting unit transmits the system information block to a terminal in a Radio Resource Control (RRC) idle mode, wherein the system information block indicates a frequency resource, wherein a bandwidth of the frequency resource is less than or equal to a bandwidth of the cell, and wherein the base station causes the terminal to perform the monitoring of the paging on the frequency resource.

* * * * *